(12) United States Patent
Cho

(10) Patent No.: US 7,613,231 B2
(45) Date of Patent: Nov. 3, 2009

(54) APPARATUS AND METHOD FOR DETECTING CODE OF DIRECT SEQUENCE SPREAD SPECTRUM SIGNAL

(75) Inventor: Youngha Cho, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 606 days.

(21) Appl. No.: 11/534,932

(22) Filed: Sep. 25, 2006

(65) Prior Publication Data

US 2007/0091987 A1 Apr. 26, 2007

(30) Foreign Application Priority Data

Oct. 26, 2005 (KR) .............. 10-2005-0101481

(51) Int. Cl.
*H04B 1/707* (2006.01)
(52) U.S. Cl. ............................................ 375/148
(58) Field of Classification Search .......... 375/142, 375/144, 148, 150
See application file for complete search history.

(56) References Cited

U.S. PATENT DOCUMENTS

| 4,754,493 | A | * | 6/1988 | Coates ................... 382/278 |
| 6,266,365 | B1 | * | 7/2001 | Wang et al. ............. 375/150 |
| 7,312,753 | B2 | * | 12/2007 | Inaba ..................... 342/465 |
| 2001/0003531 | A1 | * | 6/2001 | Suzuki et al. ........... 375/142 |
| 2002/0006158 | A1 | * | 1/2002 | Schmidl et al. ......... 375/150 |
| 2006/0045171 | A1 | * | 3/2006 | Ryu et al. ............... 375/148 |
| 2007/0058700 | A1 | * | 3/2007 | Fenton ................... 375/150 |

* cited by examiner

*Primary Examiner*—Kevin Y Kim
(74) *Attorney, Agent, or Firm*—Lowe Hauptman Ham & Berner, LLP

(57) ABSTRACT

Provided is an apparatus and method for detecting a code of a direct sequence spread spectrum signal obtained by spreading data in a direct sequence spread spectrum method with a predetermined code to despread the direct sequence spread spectrum signal. The apparatus includes an analog-digital (AD) converter, a serial-to-parallel converter, a triple correlator, a data dependency remover, and a mean value calculator. Herein, the code used for the spreading of the spread spectrum signal is detected by using a set of discrete time delay sequence pairs that the mean correlation function value outputted from the mean value calculator becomes a maximum.

15 Claims, 4 Drawing Sheets

(a)

(b)

APPARATUS AND METHOD FOR DETECTING CODE OF DIRECT SEQUENCE SPREAD SPECTRUM SIGNAL

RELATED APPLICATION

The present application is based on, and claims priority from, Korean Application Number 2005-101481, filed Oct. 26, 2005, the disclosure of which is hereby incorporated by reference herein in its entirety.

BACKGROUND OF THE INVENTION

1. Field of the Invention

The present invention relates to an apparatus and method for detecting a code of a direct sequence spread spectrum signal, and more particularly, to a direct sequence spread spectrum signal code detecting apparatus that can reduce influence of noise and data when a pseudo noise (PN) code of a direct sequence spread spectrum signal, which does not have information on a PN code, is detected by using a triple correlation function in a Code Division Multiple Access (CDMA) communication system, and a method thereof.

2. Description of the Related Art

A Code Division Multiple Access (CDMA) communication system, which was adopted as a main wireless mobile communication method in Korea, is based on a frequency band spread communication technology. Due to its property that it is hard to be wiretapped and strong against interference radio wave, the frequency band spread communication technology has been used in military devices. According to the frequency band spread communication technology, data to be transmitted in a transmitter are transmitted by coding the data by using a predetermined code to thereby spread the spectrum of the data and generate a spread spectrum signal, and transmitting the spread spectrum signal. A receiver receives the data by dispreading the received spread spectrum signal by using the code to thereby recover the data.

Generally, a receiver includes PN code information of transmitted spread spectrum signal in a commercial CDMA communication system, it receives desired data by dispreading the received signal with the PN code. However, a military communication system or a spectrum surveillance system should acquire data from received spread spectrum signal by detecting a PN code from the received spread spectrum signal without information on what PN code is used in the received spread spectrum signal under the assumption that the received spread spectrum signal exists within a broad bandwidth of the receiver.

Despite the Low Probability of Interception (LPI) characteristic of spread spectrum signals, researchers have studied to detect a PN code to extract data from the spread spectrum signals without PN code information.

Conventional PN code detection methods include a method using an interception receiver or a radiometer receiver, a Gardner's method based on cyclostationarity, and a higher order statistical signal processing method.

The conventional method using an interception receiver or a radiometer receiver has a shortcoming that the PN code detection performance is poor.

The method suggested by Gardner is based on cyclostationarity that a code is repeated in spread spectrum signal. The Gardner's method shows better detection performance than the method using an interception receiver or a radiometer receiver. However, it can only confirm the presence of a spread spectrum signal and it cannot exactly extract a PN code from a received spread spectrum signal.

On the contrary, the high-degree statistical signal processing method has an advantage that it can check the presence of a spread spectrum signal and extract a PN code form a spread spectrum signal. A representative form of the high-degree statistical signal processing method is to use a triple correlation function (TCF).

Hereinafter, a conventional method of extracting a PN code by using a triple correlation function will be described.

The following Equation 1 is a triple correlation function.

$$R_{m_i}(\tau_1, \tau_2) = \frac{1}{N}\sum_{n=1}^{N} r_{m_i}(n) r_{m_i}(n+\tau_1) r_{m_i}(n+\tau_2) \qquad \text{Eq. 1}$$

where $m_i$ denotes an arbitrary PN code; $r_{m_i}(n)$ denotes a sampled discrete signal of a spread spectrum signal spread by $m_i$; $\tau_1$ and $\tau_2$ denote discrete time delay; and N denotes the number of discrete samples used for correlation.

A triple correlation function value obtained based on the triple correlation function value presented in the Equation 1 has a value of 1 or $-1/N$ with respect to all $\tau_1$ and $\tau_2$. Herein, 1 is a peak value of the triple correlation function value for a PN code. When triple correlation function is operated with respect to an arbitrary discrete sequence, the triple correlation function of a PN code does not produce any peak value pattern. Thus, it is possible to check whether a spread spectrum signal exists within a given bandwidth by comparing a calculation result with an ideal peak value pattern of the triple correlation function of a received discrete signal.

After it is checked whether there is a spread spectrum signal by using the triple correlation function value, the length of the PN code is detected. The triple correlation function value has a pattern repeated at a predetermined interval, when the number N of discrete samples used for correlation is sufficiently large. The period of the repeating pattern becomes the length of the PN code.

Subsequently, when there is a peak value of the triple correlation function value, the PN code can be detected by using a discrete time delay sequence pair $(\tau_1, \tau_2)$. First, the discrete time delay sequence pair $(\tau_1, \tau_2)$ is acquired, when there is a peak value of the triple correlation function value. The pair is called a peak location, and a set of peak locations can be expressed as the following Equation 2.

$$P_{m_i} = \{(\tau_1, \tau_2) | R_{m_i}(\tau_1, \tau_2) = 1\} \qquad \text{Eq. 2}$$

The set $P_{m_i}$ is determined based on an arbitrary PN code $m_i$. Since the set is predetermined differently according to each PN code, it is possible to determine a PN code.

As described above, the conventional PN code detection method can be used to detect a PN code in a spread spectrum signal without PN code information. However, there is a problem that reliability is poor because the triple correlation function value is under a strong influence of noise and data spread by a PN code.

SUMMARY OF THE INVENTION

Accordingly, the present invention is directed to an apparatus and method for detecting a code of a direct sequence spread spectrum signal that substantially obviates one or more problems due to limitations and disadvantages of the related art.

An object of the present invention is to provide an apparatus for detecting a code of a direct sequence spread spectrum signal that can reduce influence of noise and data, when a pseudo noise (PN) code of a direct sequence spread spectrum signal which does not have information on a PN code is detected by using a triple correlation function in a Code Division Multiple Access (CDMA) communication system.

Another object of the present invention is to provide a method for detecting a code of a direct sequence spread spectrum signal that can reduce influence of noise and data, when a PN code of a direct sequence spread spectrum signal which does not have information on a PN code is detected by using a triple correlation function in a CDMA communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an aspect of the present invention, there is provided an apparatus for detecting a code from a direct sequence spread spectrum signal obtained by spreading data in a direct sequence spread spectrum method with a predetermined code to despread the direct sequence spread spectrum signal, the apparatus which includes: an analog-digital (AD) converter for converting the direct sequence spread spectrum signal into a discrete signal at a predetermined sampling rate; a serial-to-parallel converter for windowing the discrete signal into signals of a predetermined length at least once; a triple correlator for calculating triple correlation function values of the windowed discrete signals by using an arbitrary discrete time delay; a data dependency remover for removing data dependency caused by the data from the multiple triple correlation function values outputted from the triple correlator; and a mean value calculator for calculating a mean value of the multiple correlation function values without data dependency outputted from the data dependency remover, wherein the code used for the spreading of the spread spectrum signal is detected by using a set of discrete time delay sequence pairs that the mean correlation function value outputted from the mean value calculator becomes a maximum.

The code may be a pseudo noise (PN) code.

The length of the discrete signal to be windowed in the serial-to-parallel converter may be at least twice as long as the length of the code.

The triple correlator calculates the triple correlation function values of the windowed discrete signals based on an Equation expressed as:

$$R_{m_i}^k(\tau_1, \tau_2) = \frac{1}{L}\sum_{n=1}^{L} r_{m_i}^k(n) r_{m_i}^k(n+\tau_1) r_{m_i}^k(n+\tau_2)$$

where $R_{m_i}^k(\tau_1,\tau_2)$ denotes a triple correlation function value; L denotes a length of a discrete sample used for triple correlation; $m_i$ denotes an arbitrary PN code; $r_{m_i}^k$ denotes a $k^{th}$ windowed discrete signal among sampled discrete signals of the spread spectrum signal spread by $m_i$; and $\tau_1$ and $\tau_2$ denote arbitrary discrete time delays.

When the direct sequence spread spectrum signal is a signal obtained from Binary Phase Shift Keying (BPSK) modulation, the data dependency remover may square an absolute value of each triple correlation function value outputted from the triple correlator and output the squared values.

The direct sequence spread spectrum signal code detecting apparatus further includes: a band determiner for determining whether the spread spectrum signal exists within a band by comparing a peak value pattern of the mean correlation function value outputted from the mean value calculator with an ideal peak value pattern; a code length measurer for measuring the length of the code by using a pattern that the peak value of the mean correlation function value outputted from the mean value calculator is repeated; and a code recognizer for detecting the code used for the spreading of the spread spectrum signal by using a set of discrete time delay sequence pairs that the mean correlation function value outputted from the mean value calculator becomes a maximum.

According to another aspect of the present invention, there is provided a method for detecting a code from a direct sequence spread spectrum signal obtained by spreading data in a direct sequence spread spectrum method with a predetermined code to despread the direct sequence spread spectrum signal, the method which includes the steps of: a) converting the direct sequence spread spectrum signal into a discrete signal at a predetermined sampling rate; b) windowing the discrete signal into signals of a predetermined length at least once; c) calculating triple correlation function values of the windowed discrete signals by using an arbitrary discrete time delay; d) removing data dependency caused by the data from the multiple triple correlation function values; and e) calculating a mean value of the multiple correlation function values without data dependency, wherein the code used for the spreading of the spread spectrum signal is detected by using a set of discrete time delay sequence pairs that the mean correlation function value becomes a maximum.

The code may be a pseudo noise (PN) code, and the length of the discrete signal to be windowed in the windowing step b) may be at least twice as long as the length of the code.

The triple correlation function values of the windowed discrete signals may be calculated in the step c) based on an Equation expressed as:

$$R_{m_i}^k(\tau_1, \tau_2) = \frac{1}{L}\sum_{n=1}^{L} r_{m_i}^k(n) r_{m_i}^k(n+\tau_1) r_{m_i}^k(n+\tau_2)$$

where $R_{m_i}^k(\tau_1,\tau_2)$ denotes a triple correlation function value; L denotes a length of a discrete sample used for triple correlation; $m_i$ denotes an arbitrary PN code; $r_{m_i}^k$ denotes a $k^{th}$ windowed discrete signal among sampled discrete signals of a spread spectrum signal spread by $m_i$; and $\tau_1$ and $\tau_2$ denote arbitrary discrete time delays.

When the direct sequence spread spectrum signal may be a signal obtained from Binary Phase Shift Keying (BPSK) modulation, an absolute value of each triple correlation function value may be squared and outputted in the data dependency removing step d).

The direct sequence spread spectrum signal code detecting method may further include the step of: g) re-establishing at least one among the sampling rate, the length of the windowed discrete signal, and the number of windows, when there is no code corresponding to a set of discrete time delay sequence pairs that the mean correlation function value becomes a maximum in the code detecting step f).

The method may further include the steps of: h) determining whether the spread spectrum signal exists within a band by comparing a peak value pattern of the mean correlation function value outputted in the mean value acquisition step e) with an ideal peak value pattern; and i) measuring a length of the code by using a repeating pattern where the peak value of the mean correlation function value outputted from the mean value acquisition step e) is repeated.

The method may further include the step of: j) re-establishing at least one among the sampling rate, the length of the windowed discrete signal, and the frequency number of windowing, when there is no spread spectrum signal in the step h) of determining whether there is a spread spectrum signal.

The method may further include the step of: k) re-establishing at least one among the sampling rate, the length of the windowed discrete signal, and the frequency number of windowing, when there is no repeating pattern that the peak value of the mean correlation function value is repeated, in the code length measurement step i).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
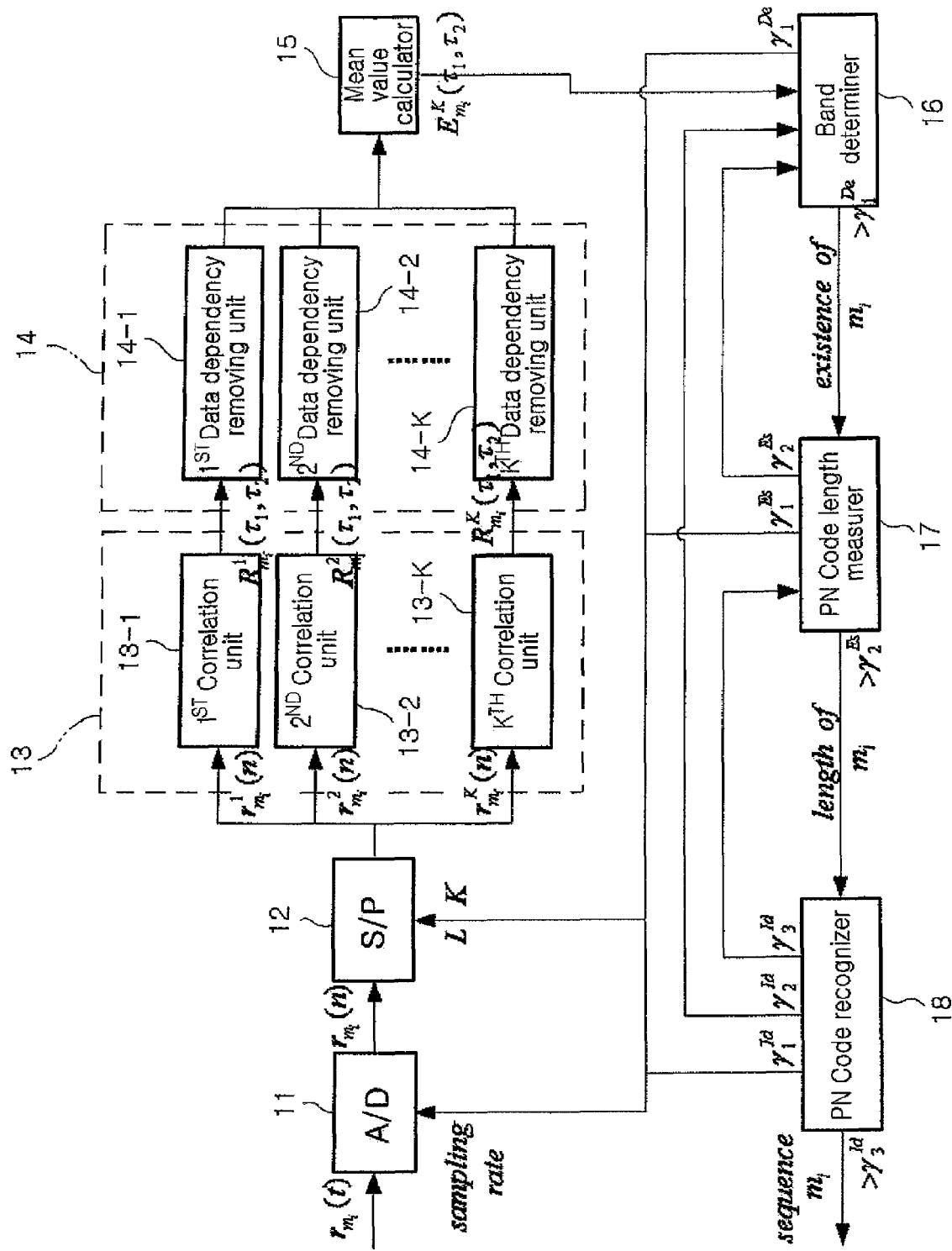
FIG. 1 is a block view showing an apparatus for detecting a code of a direct sequence spread spectrum signal in accordance with an embodiment of the present invention.

Reference will now be made in detail to the preferred embodiments of the present invention, examples of which are illustrated in the accompanying drawings. The embodiments of the present invention, however, can be modified into diverse forms, and the present embodiment is not limited to the embodiments described herein. The embodiments are presented only to make those skilled in the art of the present invention understood the present invention. Therefore, the shapes and dimensions of the constituent elements described in the drawings may be exaggerated for clear description.

FIG. 1 is a block view showing an apparatus for detecting a code of a direct sequence spread spectrum signal in accordance with an embodiment of the present invention. In the drawing, a spread spectrum signal which is spread by using a pseudo noise (PN) code in a Code Division Multiple Access (CDMA) system will be described. However, it is obvious to those skilled in the art that the present invention can be applied to spread spectrum signals spread by using codes other than a PN code.

Referring to FIG. 1, the apparatus for detecting a code of a direct sequence spread spectrum signal, which is suggested in the present invention, includes an analog-digital (AD) converter 11, a serial-to-parallel converter 12, a triple correlator 13, a data dependency remover 14, a mean value calculator 15. It may further include a band determiner 16, a PN code length measurer 17, and a PN code recognizer 18.

The AD converter 11 converts a direct sequence spread spectrum signal $r_{m_i}(t)$ into a discrete signal $r_{m_i}(n)$ at a predetermined sampling rate. The received direct sequence spread spectrum signal $r_{m_i}(t)$ is a signal obtained by spreading data to be transmitted from a transmitter in a direct sequence spreading method by using a predetermined code. Since the received direct sequence spread spectrum signal is modulated and transmitted in the form of an analog signal to be transmitted through a channel, a receiver receives the analog signal. Therefore, the received analog signal is converted into a discrete signal at a predetermined sampling rate in the AD converter 11. The discrete signal is a signal obtained by spreading the data transmitted from the transmitter.

The serial-to-parallel converter 12 performs windowing onto discrete signals outputted from the AD converter more than once to produce signals of a predetermined length and outputs windowed discrete signals $r_{m_i}^1(n)$, $r_{m_i}^2(n)$, ..., $r_{m_i}^K(n)$. In short, the serial-to-parallel converter 12 divides an inputted serial signal into signals of a predetermined length and outputs the signals in parallel. Herein, the length of the discrete signals windowed by the serial-to-parallel converter 12 should be at least twice as long as the code length to detect the length of the code based on a repeating pattern of a peak value of a correlation function.

Differently from conventional technologies, the present invention features windowing the inputted spectrum-spread discrete signal into signals of a predetermined length, i.e., windowed discrete signals, acquiring a triple correlation function value for each of the windowed discrete signals, and calculating a mean value of the triple correlation function values. Therefore, although triple correlation function values of some windowed discrete signals are not accurately obtained due to noise, the influence of the noise can be reduced.

The triple correlator 13 calculates triple correlation function values of the windowed discrete signals based on an arbitrary discrete time delay. The triple correlator 13 may include first to $K^{th}$ correlation units 13-1 to 13-K for calculating triple correlation function values of the discrete signals. The correlation unit calculates a triple correlation function value of an inputted discrete signal based on the following Equation 3.

$$R_{m_i}^k(\tau_1, \tau_2) = \frac{1}{L}\sum_{n=1}^{L} r_{m_i}^k(n) r_{m_i}^k(n+\tau_1) r_{m_i}^k(n+\tau_2) \qquad \text{Eq. 3}$$

where $R_{m_i}^k(\tau_1,\tau_2)$ denotes a triple correlation function value; L denotes a length of a discrete sample used for triple correlation; $m_i$ denotes an arbitrary PN code; $r_{m_i}^k$ denotes a $k^{th}$ windowed discrete signal among sampled discrete signals of a spread spectrum signal spread by $m_i$; and $\tau_1$ and $\tau_2$ denote arbitrary discrete time delays.

Triple correlation function values of the K discrete signals windowed in the serial-to-parallel converter 12 are obtained based on the Equation 3.

The data dependency remover 14 removes data dependency from the triple correlation function values outputted from the triple correlator 13. The data dependency remover 14 may include first to $K^{th}$ data dependency removing units for removing data dependency from the correlation function values outputted from the correlation units 13-1 to 13-K of the triple correlator 13. Triple correlation function values of received signals including noise and data range from −0.6 to 0.6. However, since the triple correlation function value of a PN code should have only 1 or −1/N, it is hard to figure out the presence of a spread spectrum signal with a triple correlation function value of a spread spectrum signal obtained by spreading data with a PN code. To solve this problem, the data dependency remover 14 is used to remove dependency of data and thereby increase reliability of PN code detection.

For example, when the discrete signal is a signal obtained through Binary Phase Shift Keying (BPSK) modulation in the transmitter, the data dependency remover 14 squares the absolution value of each triple correlation function value outputted from the triple correlator 13 and outputs the squared values. It is known that data dependency is removed when the absolute value of a triple correlation function value of a BPSK-modulated signal is squared. In short, the data dependency remover 14 of the present invention performs the operation as shown in Equation 4 to remove the data dependency from a BPSK-modulated signal.

$$g(R_{m_i}^k(\tau_1,\tau_2))=|R_{m_i}^k(\tau_1,\tau_2)|^2 \quad \text{Eq. 4}$$

Herein, g(x) is a function for removing data dependency. The detailed description section of the present invention describes an example of BPSK modulation. However, when another modulation is used, a data dependency removal equation corresponding to the modulation method may be used.

The mean value calculator 15 calculates a mean value of a plurality of correlation function values without data dependency, which are outputted from the data dependency remover 14. In other words, the mean value calculator 15 calculates a mean value of the entire triple correlation function values without data dependency outputted from the data dependency remover 14 based on the following Equation 5.

$$E_{m_i}^k = \frac{1}{K}\sum_{k=1}^{K} g(R_{m_i}^k(\tau_1,\tau_2)) \quad \text{Eq. 5}$$

The band determiner 16 determines whether there is a spread spectrum signal within a band by comparing a peak value pattern of the mean correlation function value outputted from the mean value calculator 15 with an ideal peak value pattern.

Figure 2:
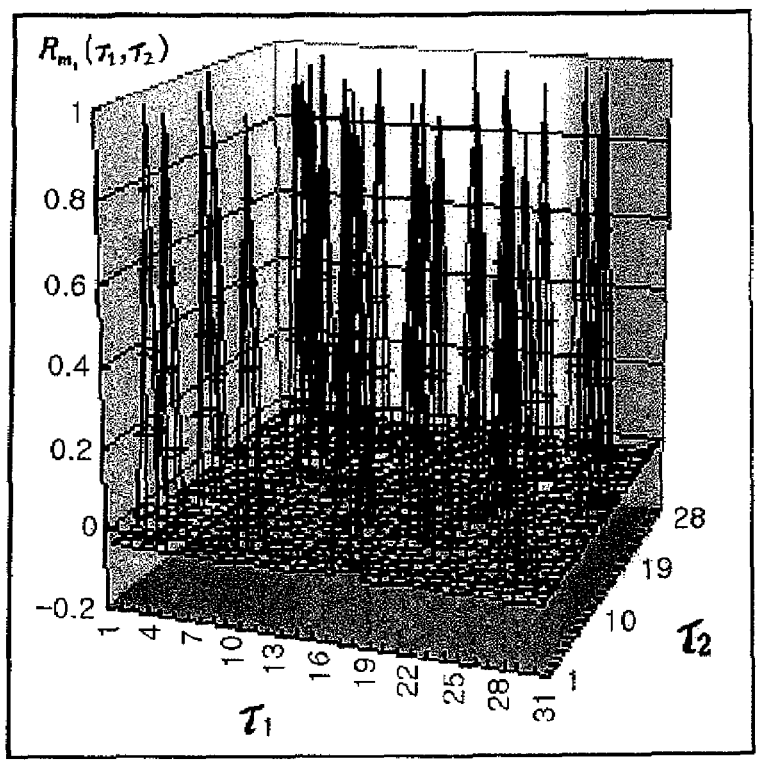
FIGS. 2A and 2B are three-dimensional and two-dimensional graphs showing an example of a triple correlation function value, respectively.
Figure 2:
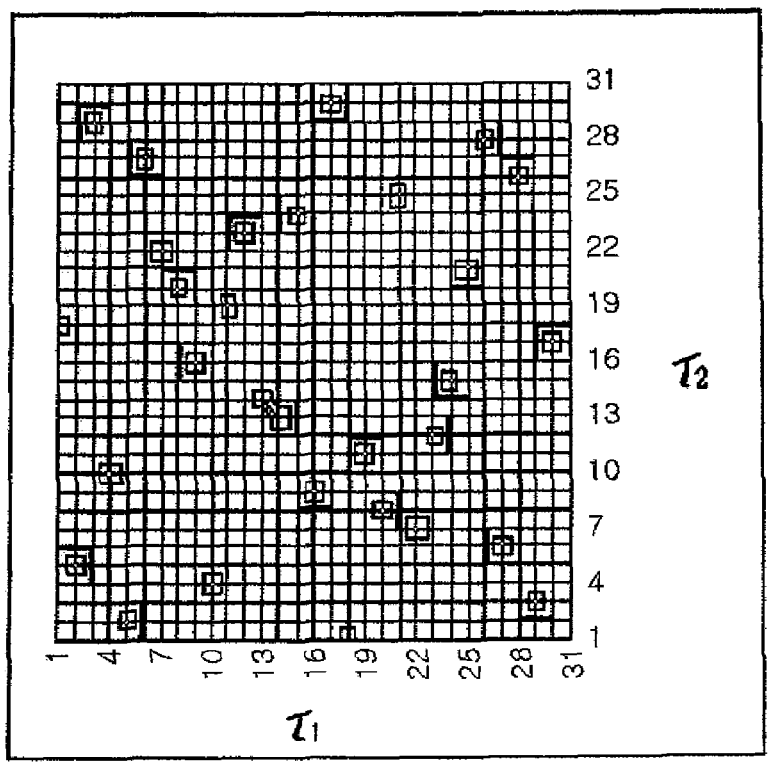

FIGS. 2A and 2B are three-dimensional and two-dimensional graphs showing an example of a triple correlation function value, respectively. Referring to FIGS. 2A and 2B, the triple correlation function value has a value of 1 in some $\tau_1$ and $\tau_2$ sequence pairs, and has a value of −1/ in the other sequence pairs. In short, as described above, triple correlation function values of spread spectrum signals using a PN code, which are obtained from the triple correlation function of the Equation 3, have 1 or −1/N with respect to all $\tau_1$ and $\tau_2$ sequence pairs. Herein, '1' is the peak value of the triple correlation function for the PN code. When a triple correlation function operation is performed onto a discrete signal which is not spread by using a PN code, the peak value pattern of the triple correlation function of a PN code, which is shown in FIG. 2A, does not exist. Therefore, it is possible to check whether there is a spread spectrum signal within a given bandwidth by comparing a triple correlation function operation result of a received discrete signal with the ideal peak value pattern.

The band determiner 16 converts the triple correlation function value without data dependency outputted from the mean value calculator 15 into a conversion value through an additional operation process, and compares the conversion value with a predetermined threshold value $\gamma_1^{De}$. When the conversion value is larger than the threshold value $\gamma_1^{De}$, it determines that there is a spread spectrum value. When the conversion value is smaller than the threshold value $\gamma_1^{De}$, it commands the AD converter 11 to change the sampling rate. This is because lack of precision in sampling may lead to detecting no spread spectrum signal. Also, when the conversion value of the correlation function value is smaller than the threshold value $\gamma_1^{De}$, the band determiner 16 may command the serial-to-parallel converter 12 to change the length L of windowing or the frequency number K of windowing. This is because a spread spectrum signal may not be detected due to short windowing length (L) and insufficient windowing frequency number K, just as the sampling rate is changed.

Figure 3:
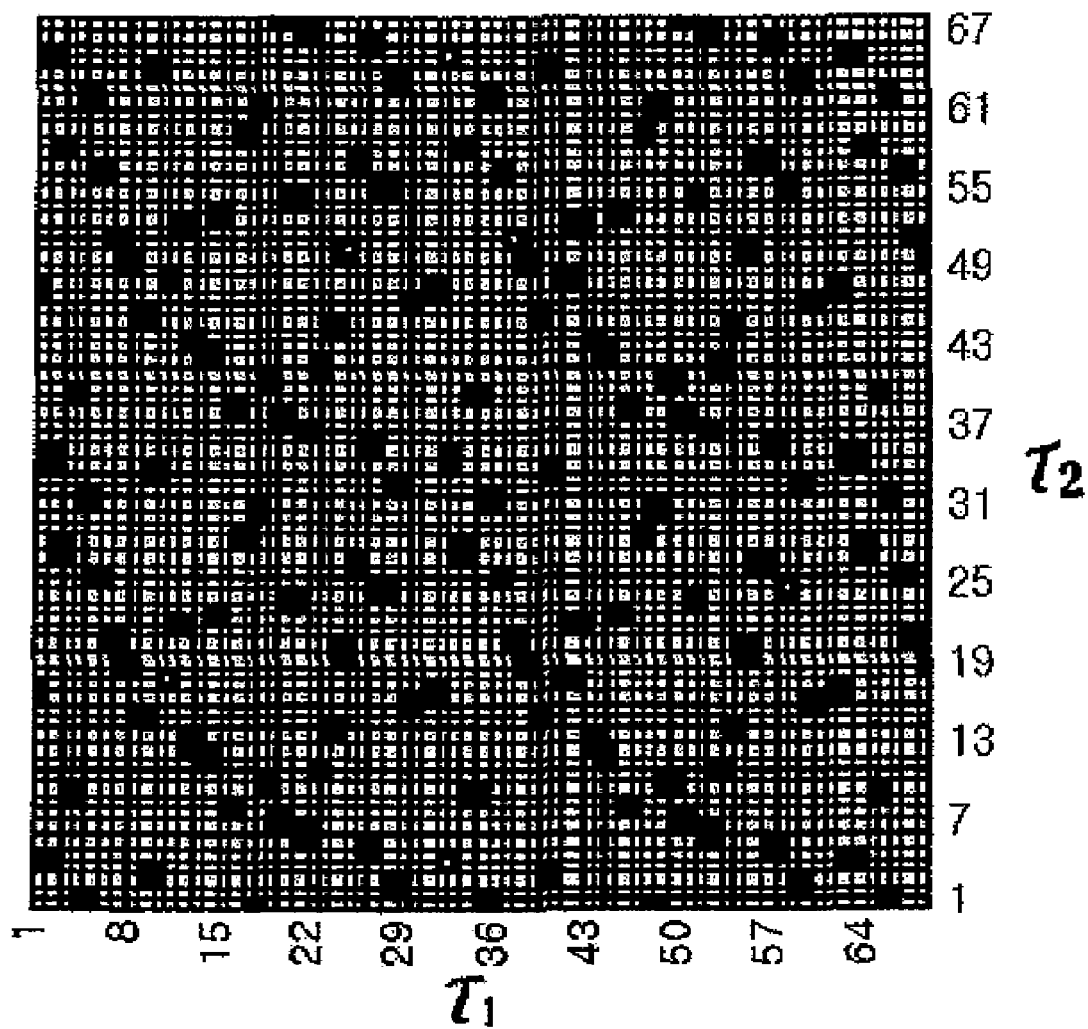
FIG. 3 is a graph showing an example of a triple function value when the number of discrete samples is increased.

The PN code length measurer 17 measures the length of a code by using a repeating pattern that a peak value of a mean correlation function value outputted from the mean value calculator 15 is repeated. FIG. 3 is a graph showing an example of a triple function value when the number of discrete samples is increased. As shown in FIG. 3, when the number L of samples used for the calculation of correlation function values is sufficiently increased, a pattern that a peak value emerges at a predetermined period is repeated. The period of the pattern becomes the length of a PN code. FIG. 3 shows the pattern of triple correlation function peak value in two-dimensional when L=70. Since the peak value of a triple correlation function shows up repeatedly at a period of 31, the length of the PN code is 31.

Just as the band determiner 16 does, the PN code length measurer 17 can convert a triple correlation function value without data dependency outputted from the mean value calculator 15 into a conversion value, compare the conversion value with a predetermined threshold value $\gamma_2^{Es}$, and when the conversion value is larger than the threshold value $\gamma_2^{Es}$, detects the length of the PN code. When the conversion value is smaller than the threshold value $\gamma_2^{Es}$, the PN code length measurer 17 may command the AD converter 11 to change the sampling rate. This is because lack of precision in sampling may lead to failure in detecting the length of the PN code. Also, when the conversion value is smaller than the threshold value $\gamma_2^{Es}$, the PN code length measurer 17 may command the serial-to-parallel converter 12 to change the length L of windowing or the frequency number K of windowing. This is because the length of the PN code may not be detected due to short windowing length (L) and insufficient windowing frequency number K, just as the sampling rate is changed.

The PN code recognizer 18 detects a code used for the spread of the spread spectrum signal by using a set of discrete time delay sequence pairs where a mean correlation function value outputted from the mean value calculator 15 becomes the maximum.

As described above, a PN code may be detected by using a discrete time delay sequence pair $(\tau_1, \tau_2)$ when there is the peak value of the triple correlation function. First, the discrete time delay sequence pair $(\tau_1, \tau_2)$ is acquired, when there is a peak value of the triple correlation function value. The pair is called a peak location, and a set of peak locations can be expressed as the following Equation 2.

$$P_{m_i}=\{(\tau_1,\tau_2)|R_{m_i}(\tau_1,\tau_2)=1\} \quad \text{Eq. 2}$$

The set $P_{m_i}$ is determined based on an arbitrary PN code $m_i$. Since the set is predetermined differently according to each PN code, it is possible to determine a PN code.

Just as the PN code length measurer 17 does, the PN code recognizer 18 can convert a triple correlation function value without data dependency outputted from the mean value calculator 15 into a conversion value, compare the conversion value with a predetermined threshold value $\gamma_3^{Id}$, and when the conversion value is larger than the threshold value $\gamma_3^{Id}$, detects the PN code. When the conversion value is smaller than the threshold value $\gamma_3^{Id}$, the PN code recognizer 18 may command the AD converter 11 to change the sampling rate. This is because lack of precision in sampling may lead to failure in detecting a PN code. Also, when the conversion value is smaller than the threshold value $\gamma_3^{Id}$, the PN code recognizer 18 may command the serial-to-parallel converter 12 to change the length L of windowing or the frequency number K of windowing. This is because the PN code may not be detected due to short windowing length (L) and insufficient windowing frequency number K, just as the sampling rate is changed.

The present invention also provides a method for detecting a code of a direct sequence spread spectrum signal for the direct sequence spread spectrum signal code detecting apparatus. The method of the present invention will be described with reference to FIG. 1. While the method of the present invention is described, those already described when the direct sequence spread spectrum signal code detecting apparatus is described will be omitted.

First, a direct sequence spread spectrum signal is converted into a discrete signal at a predetermined sampling rate in the AD converter 11.

The discrete signal is windowed into signals of a predetermined length in the serial-to-parallel converter 12.

Subsequently, triple correlation function values of the windowed discrete signals are acquired in the triple correlator 13 based on an arbitrary discrete time delay. The triple correlator 13 includes a plurality of correlation units 13-1 to 13-K for acquiring triple correlation function values based on the windowed discrete signals.

Then, data dependency caused by the data is removed from each of the triple correlation function values in the data dependency remover 14. The data dependency remover 14 includes a plurality of data dependency removal units 14-1 to 14-K for removing data dependency from the triple correlation function values.

Subsequently, a mean value of the correlation function values without data dependency is acquired in the mean value calculator 15.

Subsequently, it is determined in the band determiner 16 whether a spread spectrum signal exists within a band by comparing a peak value pattern of the mean correlation function values with an ideal peak value pattern. When the spread spectrum signal does not exist in the band, the sampling rate, the length of the windowed discrete signals, and/or the frequency number of windowing are/is re-established and the above steps are repeated.

When it turns out in the band determiner 16 that there is a spread spectrum signal, the length of a code is measured in the PN code length measurer 17 by using a repeating pattern where a peak value of the mean correlation function value is repeated. When there is no peak value repeating pattern, the sampling rate, the length of the windowed discrete signals, and/or the frequency number of windowing are/is re-established and the above steps are repeated.

Subsequently, when the length of the code is measured successfully by using the pattern that the peak value of the mean correlation function value is repeated, the code used for the spreading of the spread spectrum signal is detected by using a set of discrete time delay sequence pairs where the mean correlation function value becomes the maximum. This way, detection of a PN code from a spread spectrum signal without PN code information is completed.

Figure 4:
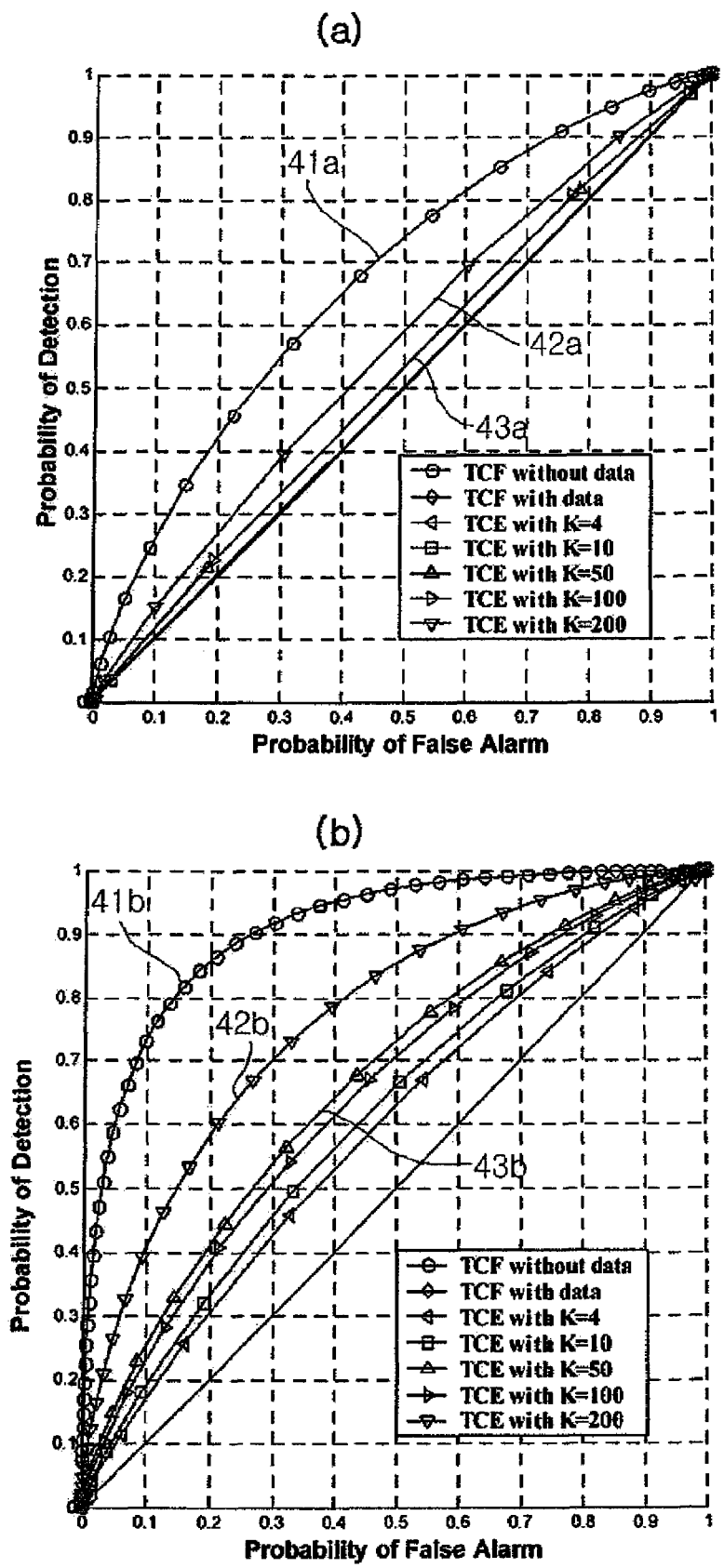
FIGS. 4A and 4B are graphs describing noise characteristic improvement of the present invention.

FIGS. 4A and 4B are graphs describing noise characteristic improvement of the present invention. FIG. 4A is a graph illustrating detection probability when a signal-to-noise ratio (SNR) is −9 dB, and FIG. 4B is a graph illustrating detection probability when a signal-to-noise ratio (SNR) is −5 dB.

Both graphs show the most excellent detection performance (see 41a and 41b) when data are not included, that is, for a PN code. On the contrary, the detection performance is better when the frequency number K of windowing is 200 in the two graphs (see 42a and 42b) than when the frequency number of windowing is less than 200.

In short, it can be seen from the graphs of FIGS. 4A and 4B that the more the frequency number of windowing is increased, the less influence the data make. Therefore, the result approaches to an ideal detection performance that can be obtained when a spread spectrum signal does not include data. In other words, the present invention reduces the influence of data.

In addition, it is possible to remove influence of noise in a noisy environment by increasing the frequency number K of windowing to thereby approach to the ideal detection performance.

As described above, the present invention can prevent the PN code detection performance from being degraded by noise and data included in a spread spectrum data by windowing a received spread spectrum signal more than once and acquiring triple correlation function values of multiple windowed spread spectrum signals.

Therefore, the present invention can improve reliability in detecting a PN code from a signal that does not include the PN code.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk, an optical magnetic disk, and carrier waves such as data transmission through the Internet. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for detecting a code from a direct sequence spread spectrum signal obtained by spreading data in a direct sequence spread spectrum method with a predetermined code to despread the direct sequence spread spectrum signal, comprising:

an analog-digital (AD) converter for converting the direct sequence spread spectrum signal into a discrete signal at a predetermined sampling rate;

a serial-to-parallel converter for windowing the discrete signal into signals of a predetermined length at least once;

a triple correlator for calculating triple correlation function values of the windowed discrete signals by using an arbitrary discrete time delay;

a data dependency remover for removing data dependency caused by the data from the multiple triple correlation function values outputted from the triple correlator; and a mean value calculator for calculating a mean value of the multiple correlation function values without data dependency outputted from the data dependency remover, wherein the code used for the spreading of the spread spectrum signal is detected by using a set of discrete time delay sequence pairs that the mean correlation function value outputted from the mean value calculator becomes a maximum.

2. The apparatus of claim 1, wherein the code is a pseudo noise (PN) code.

3. The apparatus of claim 1, wherein the length of the discrete signal to be windowed in the serial-to-parallel converter is at least twice as long as the length of the code.

4. The apparatus of claim 1, wherein the triple correlator calculates the triple correlation function values of the windowed discrete signals based on an Equation expressed as:

$$R_{m_i}^k(\tau_1, \tau_2) = \frac{1}{L}\sum_{n=1}^{L} r_{m_i}^k(n) r_{m_i}^k(n+\tau_1) r_{m_i}^k(n+\tau_2)$$

where $R_{m_i}^k(\tau_1,\tau_2)$ denotes a triple correlation function value; L denotes a length of a discrete sample used for triple correlation; $m_i$ denotes an arbitrary PN code; $r_{m_i}^k$ denotes a $k^{th}$ windowed discrete signal among sampled discrete signals of the spread spectrum signal spread by $m_i$; and $\tau_1$ and $\tau_2$ denote arbitrary discrete time delays.

5. The apparatus of claim 1, wherein when the direct sequence spread spectrum signal is a signal obtained from Binary Phase Shift Keying (BPSK) modulation, the data dependency remover squares an absolute value of each triple correlation function value outputted from the triple correlator and outputs the squared values.

6. The apparatus of claim 1, further comprising:

a band determiner for determining whether the spread spectrum signal exists within a band by comparing a peak value pattern of the mean correlation function value outputted from the mean value calculator with an ideal peak value pattern;

a code length measurer for measuring the length of the code by using a pattern that the peak value of the mean correlation function value outputted from the mean value calculator is repeated; and a code recognizer for detecting the code used for the spreading of the spread spectrum signal by using a set of discrete time delay sequence pairs that the mean correlation function value outputted from the mean value calculator becomes a maximum.

7. A method for detecting a code from a direct sequence spread spectrum signal obtained by spreading data in a direct sequence spread spectrum method with a predetermined code to despread the direct sequence spread spectrum signal, comprising the steps of:

a) converting the direct sequence spread spectrum signal into a discrete signal at a predetermined sampling rate;

b) windowing the discrete signal into signals of a predetermined length at least once;

c) calculating triple correlation function values of the windowed discrete signals by using an arbitrary discrete time delay;

d) removing data dependency caused by the data from the multiple triple correlation function values; and e) calculating a mean value of the multiple correlation function values without data dependency, wherein the code used for the spreading of the spread spectrum signal is detected by using a set of discrete time delay sequence pairs that the mean correlation function value becomes a maximum.

8. The method of claim 7, wherein the code is a pseudo noise (PN) code.

9. The method of claim 7, wherein the length of the discrete signal to be windowed in the windowing step b) is at least twice as long as the length of the code.

10. The method of claim 7, wherein the triple correlation function values of the windowed discrete signals are calculated in the step c) based on an Equation expressed as:

$$R_{m_i}^k(\tau_1, \tau_2) = \frac{1}{L}\sum_{n=1}^{L} r_{m_i}^k(n) r_{m_i}^k(n+\tau_1) r_{m_i}^k(n+\tau_2)$$

where $R_{m_i}^k(\tau_1,\tau_2)$ denotes a triple correlation function value; L denotes a length of a discrete sample used for triple correlation; $m_i$ denotes an arbitrary PN code; $r_{m_i}^k$ denotes a $k^{th}$ windowed discrete signal among sampled discrete signals of a spread spectrum signal spread by $m_i$; and $\tau_1$ and $\tau_2$ denote arbitrary discrete time delays.

11. The method of claim 7, wherein when the direct sequence spread spectrum signal is a signal obtained from Binary Phase Shift Keying (BPSK) modulation, an absolute value of each triple correlation function value is squared and outputted in the data dependency removing step d).

12. The method of claim 7, further comprising the step of:

g) re-establishing at least one among the sampling rate, the length of the windowed discrete signal, and the frequency number of windowing, when there is no code corresponding to a set of discrete time delay sequence pairs that the mean correlation function value becomes a maximum in the code detecting step f).

13. The method of claim 7, further comprising the steps of:

h) determining whether the spread spectrum signal exists within a band by comparing a peak value pattern of the mean correlation function value outputted in the mean value acquisition step e) with an ideal peak value pattern; and i) measuring a length of the code by using a repeating pattern where the peak value of the mean correlation function value outputted from the mean value acquisition step e) is repeated.

14. The method of claim 13, further comprising the step of:

j) re-establishing at least one among the sampling rate, the length of the windowed discrete signal, and the frequency number of windowing, when there is no spread spectrum signal in the step h) of determining whether there is a spread spectrum signal.

15. The method of claim 13, further comprising the step of:

k) re-establishing at least one among the sampling rate, the length of the windowed discrete signal, and the frequency number of windowing, when there is no repeating pattern that the peak value of the mean correlation function value is repeated, in the code length measurement step i).

* * * * *